(12) United States Patent
Pan

(10) Patent No.: US 11,421,452 B2
(45) Date of Patent: Aug. 23, 2022

(54) SIGNAL FEEDBACK DEVICE USED FOR AUTOMOTIVE LOCKING APPARATUS

(71) Applicant: Hella GmbH & Co. KGaA, Lippstadt (DE)

(72) Inventor: Yaohui Pan, Xiamen (CN)

(73) Assignee: Hella GmbH & Co. KGaA, Lippstadt (DE)

( * ) Notice: Subject to any disclaimer, the term of this patent is extended or adjusted under 35 U.S.C. 154(b) by 206 days.

(21) Appl. No.: 16/768,674

(22) PCT Filed: Oct. 24, 2018

(86) PCT No.: PCT/CN2018/111609
§ 371 (c)(1),
(2) Date: May 31, 2020

(87) PCT Pub. No.: WO2019/105155
PCT Pub. Date: Jun. 6, 2019

(65) Prior Publication Data
US 2021/0189776 A1    Jun. 24, 2021

(30) Foreign Application Priority Data
Dec. 1, 2017   (CN) .......................... 201711249602.0

(51) Int. Cl.
*B60L 1/00* (2006.01)
*E05B 81/72* (2014.01)
(52) U.S. Cl.
CPC ....... *E05B 81/72* (2013.01); *H01H 2300/052* (2013.01)
(58) Field of Classification Search
CPC .......... E05B 81/34; E05B 81/54; E05B 81/64; E05B 2015/0458; E05B 81/06; E05B 81/72; H01H 2300/052
See application file for complete search history.

(56) References Cited

U.S. PATENT DOCUMENTS

| 4,450,390 A | 5/1984 | Andrei-Alexandru et al. |
| 6,850,154 B2 * | 2/2005 | Emmerling ............. B60R 25/24 340/5.21 |

(Continued)

FOREIGN PATENT DOCUMENTS

| CN | 1833085 A | 9/2006 |
| CN | 103938955 A | 7/2014 |

(Continued)

*Primary Examiner* — Jared Fureman
*Assistant Examiner* — Esayas G Yeshaw
(74) *Attorney, Agent, or Firm* — Husch Blackwell LLP

(57) ABSTRACT

A signal feedback device used for an automotive locking apparatus is provided, comprising a car power supply, a motor, a transmission, an actuating lever, a signal feedback module, and a body control module. The signal feedback module is provided with a first feedback circuit, a second feedback circuit, and a third feedback circuit. The first feedback circuit is connected in series to a first resistor and a first on-off switch. The second feedback circuit is connected in series to a second resistor and a second on-off switch. The third feedback circuit is connected in series to a third resistor. The actuating lever is provided with a touch spot, and the corresponding circuits are turned on under driving of linear movement of the actuating lever, to provide different signal feedbacks. When the locking apparatus is abnormal or is powered off, an abnormal state signal can be detected, and the body control module can make logic judgment under the different states according to different measured resistance values, so that the situation of misjudgment caused by confusion of signals is avoided.

14 Claims, 7 Drawing Sheets

(56) References Cited

U.S. PATENT DOCUMENTS 9,008,854 B2 * 4/2015 Breed ................. E05F 15/77
  701/1
2004/0164615 A1 * 8/2004 Alexandropoulos .................
  B60R 25/243
  307/10.1

FOREIGN PATENT DOCUMENTS

| CN | 105492711 A | 4/2016 |
| CN | 107143223 A | 9/2017 |
| CN | 108193957 A | 6/2018 |
| FR | 2778939 B1 | 12/2002 |

* cited by examiner

SIGNAL FEEDBACK DEVICE USED FOR
AUTOMOTIVE LOCKING APPARATUS

CROSS REFERENCE

This application claims priority to PCT Application No. PCT/CN2018/111609, filed Oct. 24, 2018, which itself claims priority to Chinese Patent Application No. 201711249602.0, the entirety of both of which are hereby incorporated by reference.

TECHNICAL FIELD

The present invention relates to the field of automotive locking apparatus, in particular to a signal feedback device used for automotive locking apparatus.

BACKGROUND

Automotive locking apparatus may lock or unlock the gate valve of various boxes, such as various locking or unlocking structures, for example, the lock of the automotive fuel-tank cap, automotive door handle, automotive trunk, automotive engine and automotive storage box, the cover of the charging port of the electrocar, and the interface of the charging pile and charging gun etc.

Automotive locking apparatus is an important locking and unlocking device, which is controlled by a body control module (BCM). Generally, the Automotive locking apparatus is made up of a motor, a transmission (such as worm wheel, worm, and wheel gear, etc.), a signal feedback device, an upper shell, a lower shell, a power input end, an output end of signal feedback, and seal structures, etc. Currently, on the market, the locking apparatus directly controls the on-off of the feedback circuit by a micro switch and travel switch, so that the body control module (BCM) determine whether or not it is locking or unlocking. But when the locking apparatus employing this signal feedback solution is short or open circuited caused by an abnormal state in the feedback circuit, the body control module (BCM) still makes a judgement whether or not it is locking or unlocking according to its state that is short or open circuited. Such as, in the locking state, due to the feedback circuit is open circuited caused by an abnormal state, the body control module (BCM) makes a judgement that the locking apparatus is still in the unlocking state according to the pre-input logical judgment. Because there are only two kinds of signal statuses, i.e. on and off, it is bound to make a wrong judgement and send out a wrong instruction. And, another type of locking apparatus with IC and PCB signal feedback device has complex electronic components, high cost, and reliability remaining to be considered.

In view of this, the inventor has made an in-depth study of the above defects of the existing locking apparatus (actuator), thus the invention arose, which is a cross-boundary design that combines simple electronic devices with structural design without the expensive IC and PCB signal feedback devices.

SUMMARY OF THE INVENTION

In view of this, for the existent defect of prior art, the invention primarily aims at providing a signal feedback device used for automotive locking apparatus, which may provide various signal feedbacks, those are locking status signal, unlocking status signal, the signal generated when the locking apparatus in the working state between the locking and unlocking, and abnormal status signal. It has a simple and ingenious internal structure, low cost and high reliability.

To achieve the above purpose, the invention employs the following technical solutions:

A signal feedback device used for an automotive locking apparatus, comprising a car power supply, a motor, a transmission, an actuating lever, a signal feedback module and a body control module, which are interconnected.

The signal feedback module has a first feedback circuit, a second feedback circuit and a third feedback circuit, which are connected in parallel to the body control module. A first resistor and a first on-off switch are in series in the first feedback circuit. A second resistor and a second on-off switch are in series in the second feedback circuit. A third resistor is in series in the third feedback circuit.

A touch spot is provided on the actuating lever. Under the drive of the linear motion of the actuating lever, the touch spot touches the first on-off switch to turn on the first feedback circuit, so that provides a first signal feedback; the touch spot touches the second on-off switch to turn on the second feedback circuit, so that provides a second signal feedback; or the third feedback circuit is turned on, so that provides a third signal feedback.

As a preferable solution, the first signal feedback is generated according to a first resistance value detected when the first feedback circuit is turned on; the second signal feedback is generated according to a second resistance value detected when the second feedback circuit is turned on; the third signal feedback is generated according to a third resistance value detected when the third feedback circuit is turned on.

As a preferable solution, the first resistance value is a resistance value generated by the parallel connection of the first resistor and the third resistor; the second resistance value is a resistance value generated by the parallel connection of the second resistor and the third resistor; the third resistance value is a resistance value of the third resistor.

As a preferable solution, the first signal feedback is generated according to a first resistance value detected when the first feedback circuit and the second feedback are simultaneously turned on; the second signal feedback is generated according to a second resistance value detected when the second feedback circuit is turned on; the third signal feedback is generated according to a third resistance value detected when the third feedback circuit is turned on.

As a preferable solution, the first resistance value is a resistance value generated by the parallel connection of the first resistor, the second resistor and the third resistor; the second resistance value is a resistance value generated by the parallel connection of the second resistor and the third resistor; the third resistance value is a resistance value of the third resistor.

As a preferable solution, the first on-off switch refers to a first microswitch, the second on-off switch refers to a second microswitch.

As a preferable solution, the touch spot of the actuating lever is raised from the surface of the actuating lever. The touch spot touches the first microswitch or the second microswitch under the drive of the linear motion of the actuating lever, as so to close the first microswitch or the second microswitch.

As a preferable solution, the first on-off switch refers to a first travel switch, the second on-off switch refers to a second travel switch.

As a preferable solution, the touch spot of the actuating lever is raised from the surface of the actuating lever. The touch spot touches the first travel switch or the second travel switch under the drive of the linear motion of the actuating lever, as so to close the first travel switch or the second travel switch.

As a preferable solution, the touch spot contains a first touch spot and a second touch spot, the first touch spot touches the first travel switch as so to close the first travel switch, the second touch spot touches the second travel switch as so to close the second travel switch.

As a preferable solution, the first on-off switch is consisted of a first switch fixed terminal and a first elastic port slice; the second on-off switch is consisted of a second switch fixed terminal and a second elastic port slice; the first elastic port slice and the second elastic port slice are integrally molded on the two ends of a conductive spring leaf.

As a preferable solution, the touch spot of the actuating lever is raised from the surface of the actuating lever. Under the drive of the linear motion of the actuating lever, the touch spot enables the first elastic port slice to touch the first switch fixed terminal, and enables the second elastic port slice to touch the second switch fixed terminal, as so to close the first on-off switch or the second on-off switch.

As a preferable solution, the touch spot is a touch block or a spring leaf.

As a preferable solution, the transmission drives the actuating lever to move linearly via an engagement of a gear and a rack.

Comparing with the prior art, the invention has distinct advantages and beneficial effects. Specifically, as described in the above solutions, the invention improves the signal feedback device of the automotive locking apparatus, the signal feedback module comprises a first feedback, a second feedback circuit and a third feedback circuit. The signal feedback module according to the invention uses a micro switch, a travel switch or a conductive spring leaf as the switch to control a circuit to be on and off, and combines them with the corresponding resistance in each circuit to provide various signal feedbacks, those are locking status signal, unlocking status signal, the signal generated when the locking apparatus in the working state between the locking and unlocking, and abnormal status signal. Under different status, the body control module (BCM) can perform logical judgement according to the measured different resistance values, to avoid misjudgements caused by confusion of single signals. In addition, the signal feedback device of the locking apparatus according to the invention, further has advantages of simple and ingenious internal structure, low cost and high reliability.

To describe the structure characters and efficacies of the invention more distinctly, the drawings and particular embodiments are combined to detailed describe the invention in the following.

SHORT DESCRIPTION OF THE DRAWINGS

Reference is now made more particularly to the drawings, which illustrate the best presently known mode of carrying out the invention and wherein similar reference characters indicate the same parts throughout the views.

REFERENCE SYMBOLS IN DRAWINGS

Figure 1:
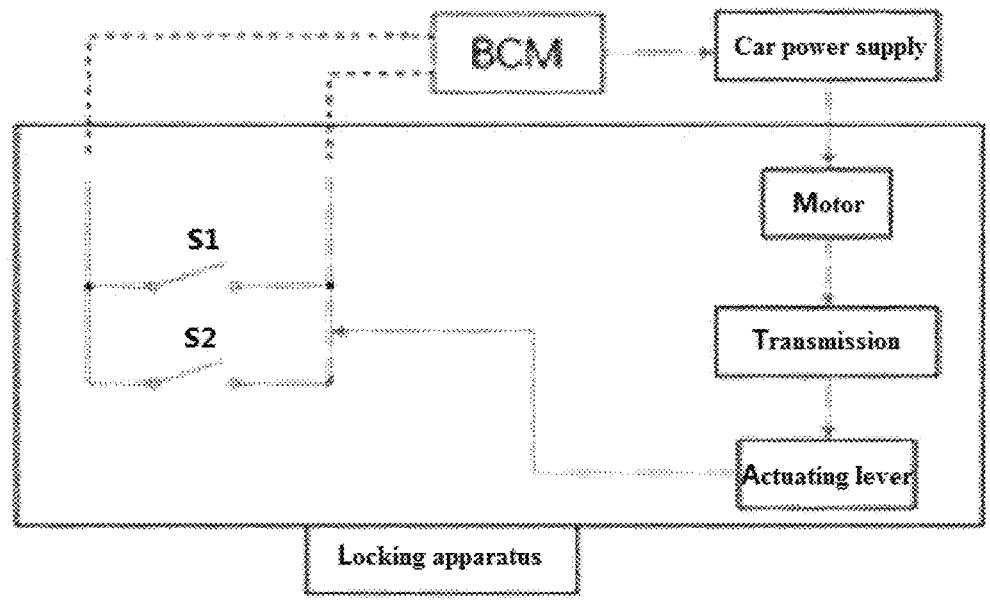
FIG. 1 is a schematic circuit diagram of a first product of the prior art.
Figure 2:
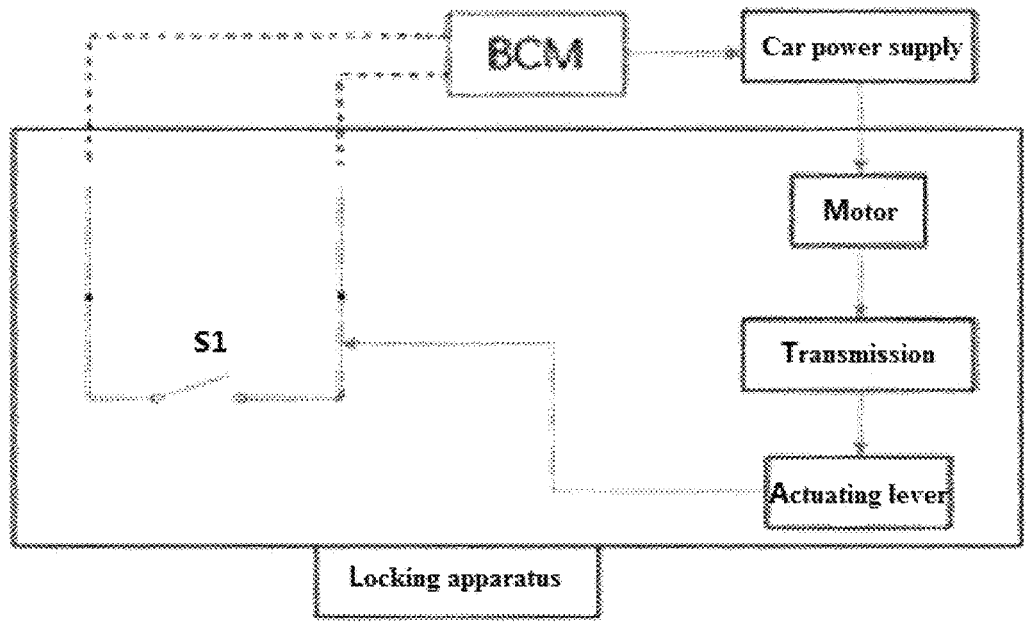
FIG. 2 is a schematic circuit diagram of a second product of the prior art.
Figure 3:
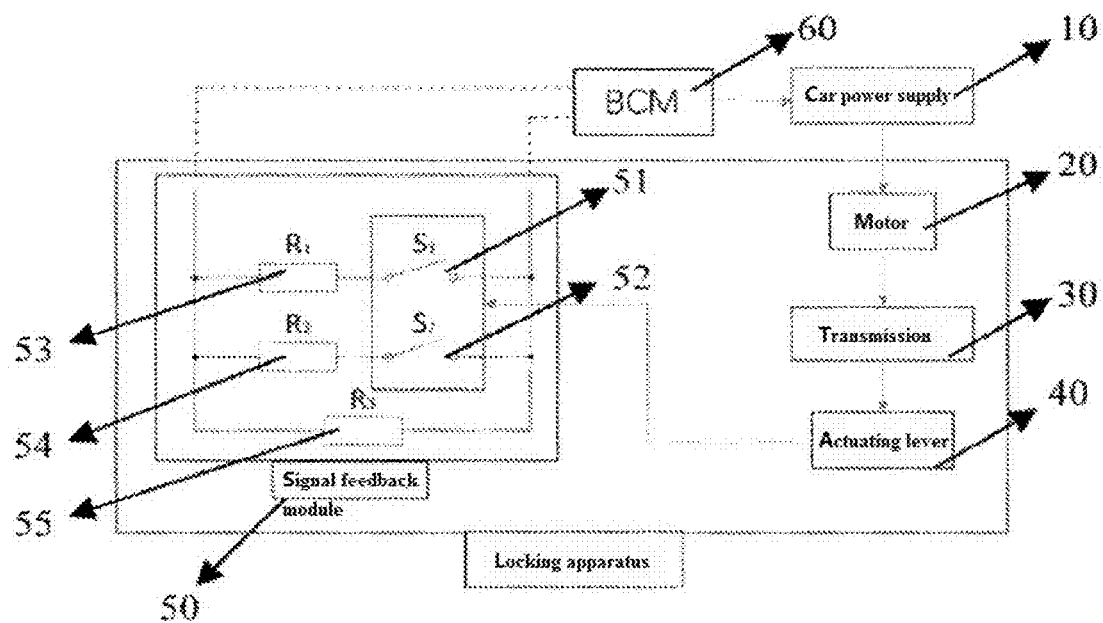
FIG. 3 is a schematic circuit diagram of a first preferable embodiment.
Figure 4:
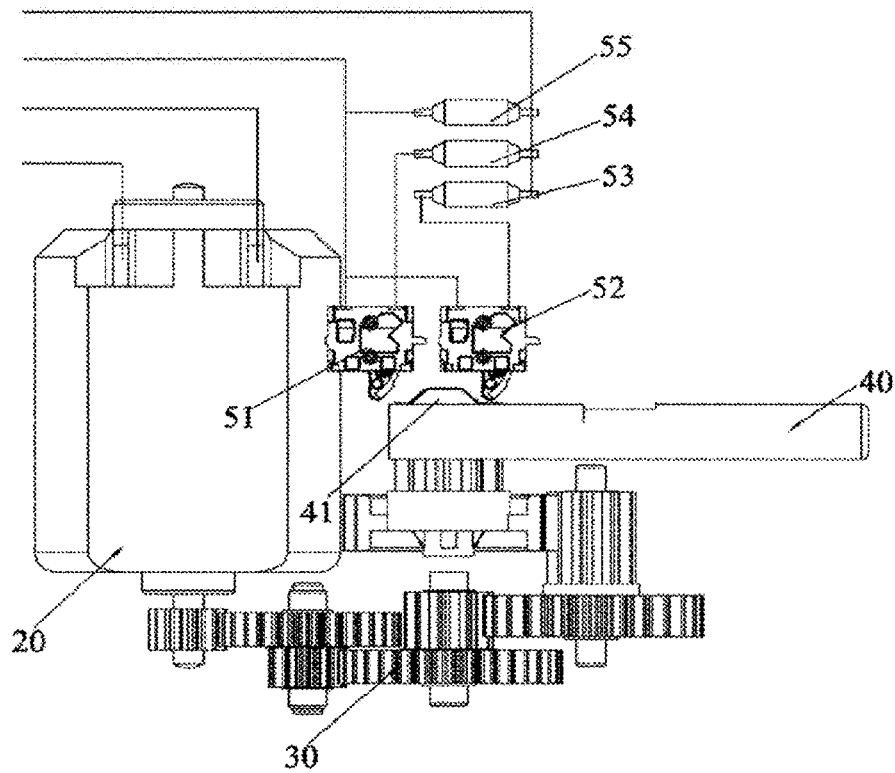
FIG. 4 is a schematic view of a structure of the first preferable embodiment.
Figure 5:
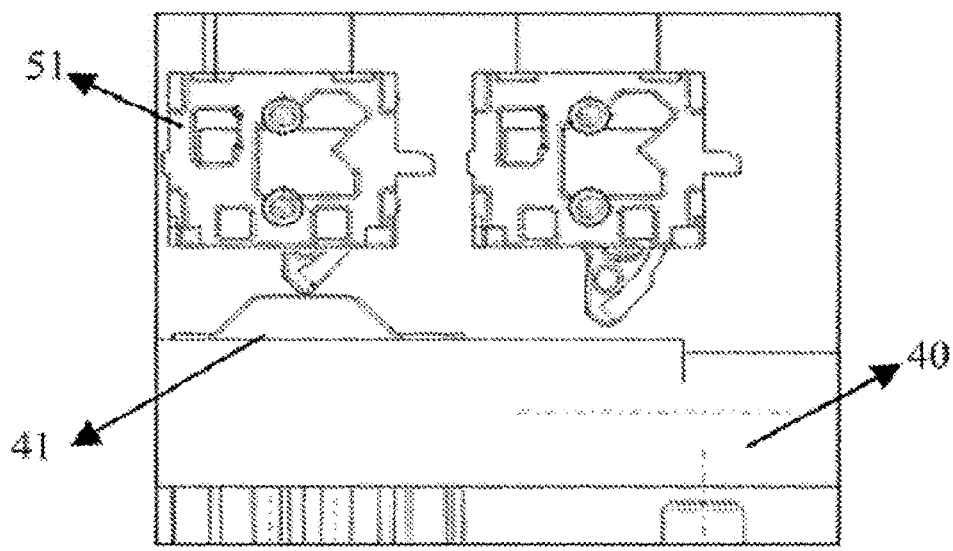
FIG. 5 is a schematic view of a retracted status of the first preferable embodiment.
Figure 6:
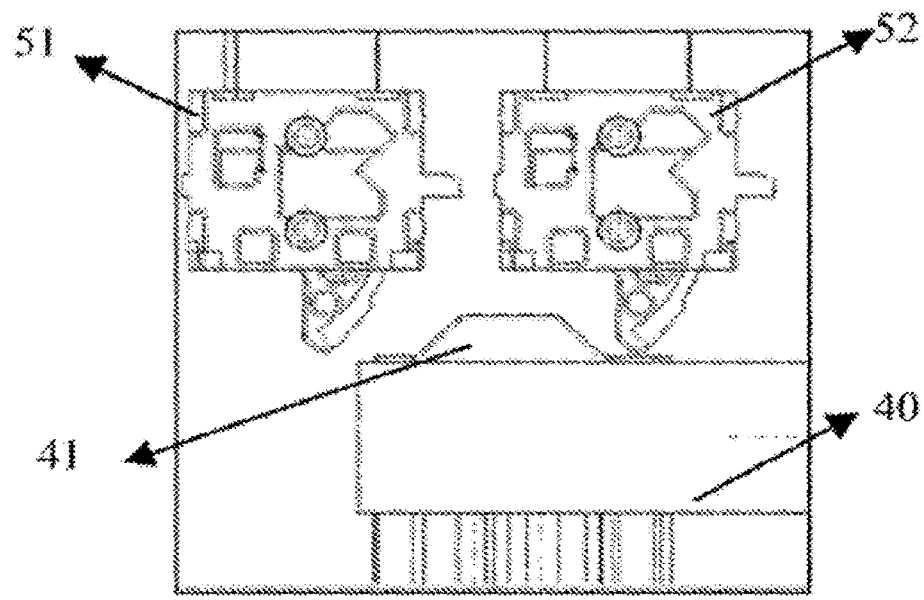
FIG. 6 is a schematic view of a work status of the first preferable embodiment.
Figure 7:
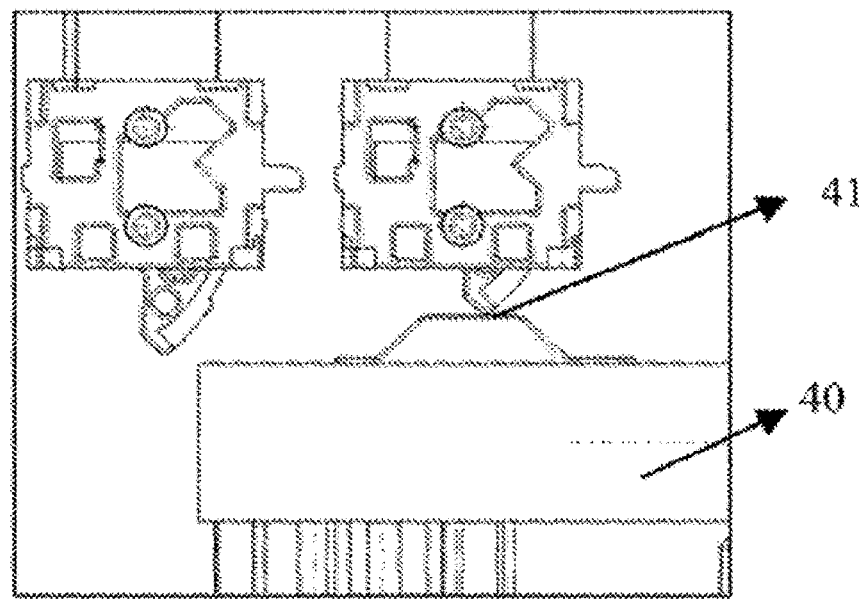
FIG. 7 is a schematic view of a stretched status of the first preferable embodiment.
Figure 8:
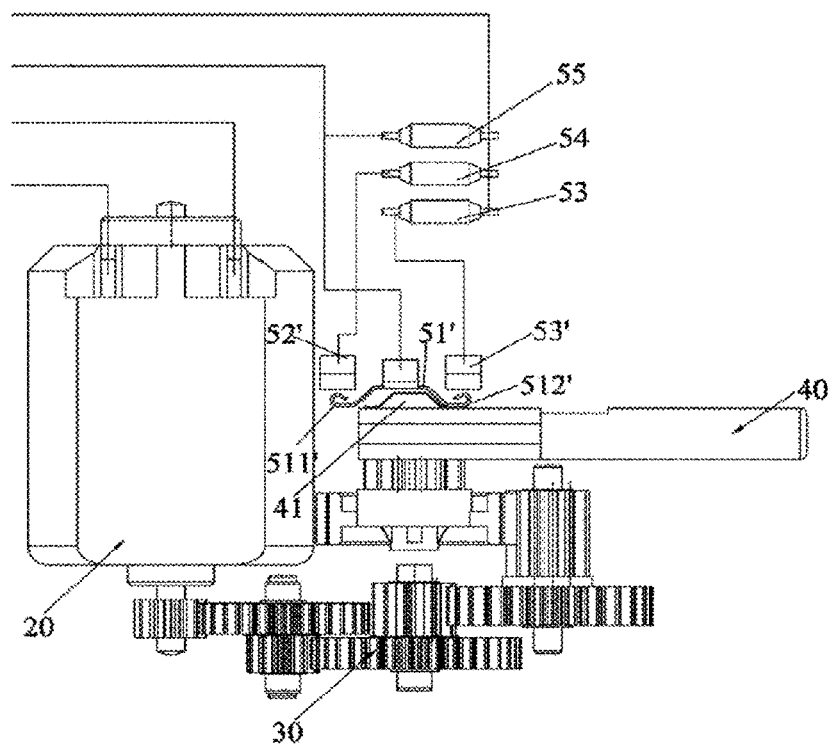
FIG. 8 is a schematic view of a structure of a third preferable embodiment.
Figure 9:
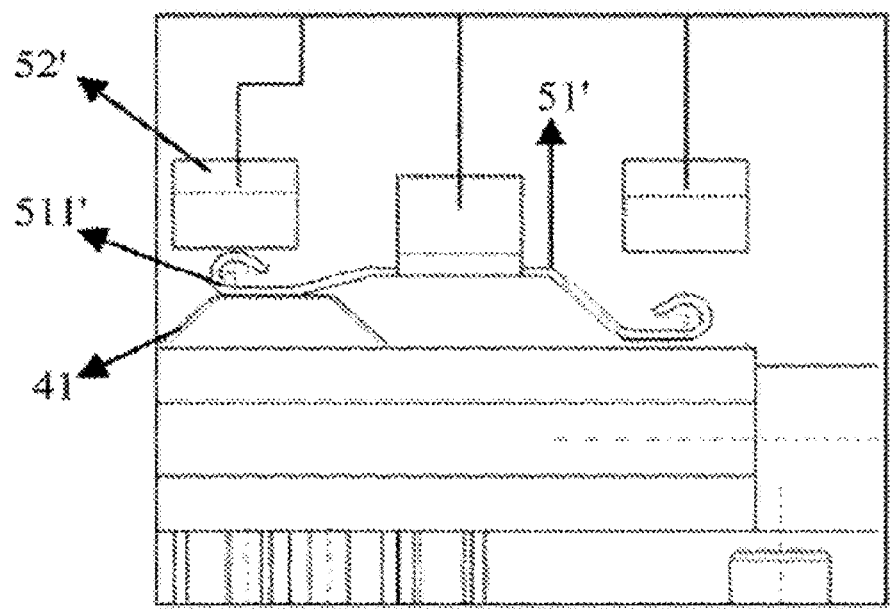
FIG. 9 is a schematic view of a retracted status of the third preferable embodiment.
Figure 10:
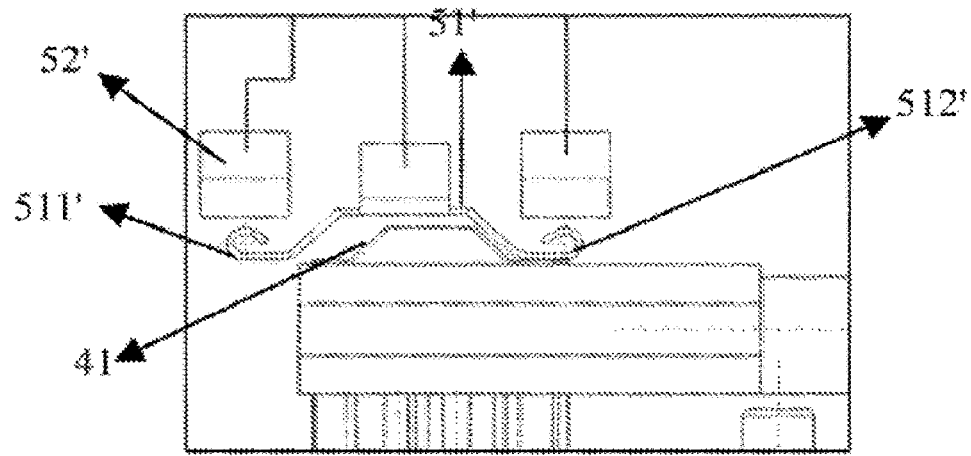
FIG. 10 is a schematic view of a work status of the third preferable embodiment.
Figure 11:
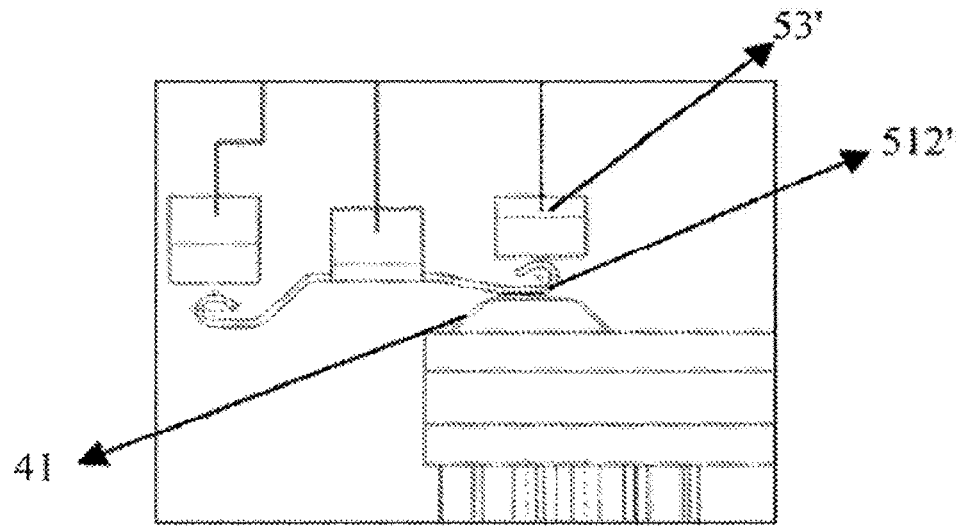
FIG. 11 is a schematic view of a stretched status of the third preferable embodiment.

10—car power supply, 20—motor,
30—transmission, 40—actuating lever,
41—touch spot, 50—signal feedback module,
51—first microswitch, 52—second microswitch,
53—first resistor, 54—second resistor,
55—third resistor, 51'—conductive spring leaf,
511'—first elastic port slice, 512'—second elastic port slice,
52'—first switch fixed terminal, 53'—second switch fixed terminal,
60—body control module.

DETAILED DESCRIPTION

Referring to FIG. 3 to FIG. 7, they show the specific structures a first preferable embodiment according to the invention, which comprises a car power supply 10, a motor 20, a transmission 30, a actuating lever 40, a signal feedback module 50 and a body control module (BCM) 60.

The car power supply 10 provides electricity supply for the whole automotive locking actuator, the car power supply 10 is connected to the motor 20, the motor 20 provides driving force to the transmission 30, the transmission 30 exports the driving force to the actuating lever 40 via multiple gears, the actuating lever 40 and the gear of the transmission 30 are gear and rack structure, the actuating lever 40 moves linearly, the transmission 30 drives the actuating lever 40 to move via the engagement of the gear and rack, to enable the actuating level 40 to stretch and retract.

The signal feedback module 50 comprises a first on-off switch 51, a second on-off switch 52, a first resistor 53, a second resistor 54 and a third resistor 55. In the embodiment, the first on-off switch refers to a first microswitch, the second on-off switch refers to a second microswitch. The first microswitch 51 are connected in series with the first resistor 53 to form a first feedback circuit; the second microswitch 52 are connected in series with the second resistor 54 to form a second feedback circuit; the third resistor 55 is in series in a third feedback circuit. The first feedback circuit, the second feedback circuit and the third feedback circuit are connected in parallel to the body control module.

A touch spot 41 is provided on the actuating lever, the touch spot 41 is a touch block or a spring leaf. The touch spot 41 touches the first microswitch 51 or the second microswitch 52 under the drive of the linear motion of the actuating lever, as so to turn on the first feedback circuit or the second feedback circuit, the third feedback circuit is always on-state, thus various of signal feedback are generated, those are, locking status signal, unlocking status signal, the signal generated when the locking apparatus in the working state between the locking and unlocking, and abnormal status signal detected when the locking apparatus is at abnormal or power-cut status.

The detailed control process are as follows: the actuating level 40 stretches out to a setting position and touches the first microswitch 51 of the signal feedback module 50 as so to turn on the first feedback circuit, by this time, the body control module may detects a first resistance value and makes a judgement that the locking apparatus is at locking status; when the actuating level 40 retracts back to a setting position and touches the second microswitch 52 of the signal feedback module 50 as so to turn on the second feedback circuit, by this time, the body control module may detects a second resistance value and makes a judgement that the locking apparatus is at unlocking status; when the actuating lever 40 is going from stretching to retracting or from retracting to stretching, the body control module may detects a third resistance value and makes a judgement that the locking apparatus is at working status. When the locking apparatus is power-cut caused by abnormal status, the body control module is unable to detect any type of resistance value, by this time, it can be concluded that the apparatus is at abnormal status, thus a misjudgement can be avoided.

The following is a design according to a second embodiment of the invention, the second embodiment are described without drawings. The specific implementation method of the second embodiment is basically identical with that of the first embodiment, and the differences between them are that: the first on-off switch 51 refers to a first travel switch, the second on-off switch 52 refers to a second travel switch. Given this, the structure of the actuating lever 40 is changed accordingly: the touch spot of the actuating lever is raised from the surface of the actuating lever, the touch spot touches the first travel switch or the second travel switch under the drive of the linear motion of the actuating lever, as so to close the first travel switch or the second travel switch. In the second embodiment, the touch spot contains a first touch spot and a second touch spot, the first touch spot touches the first travel switch to close the first travel switch, the second touch spot touches the second travel switch to close the second travel switch.

Referring to FIG. 8 to FIG. 11, they show the specific structures a third preferable embodiment according to the invention. The structures of the third embodiment is basically identical with that of the first embodiment, and the difference between them is that: the signal feedback module 50 includes a conductive spring leaf 51', a first switch fixed terminal 52', a second switch fixed terminal 53', a first resistor 53, a second resistor 54 and a third resistor 55. A first elastic port slice 511' and a second elastic port slice 512' are provided on the two ends of a conductive spring leaf, the first on-off switch 51 is made up of the first elastic port slice and the first switch fixed terminal, the second on-off switch 52 is made up of the second elastic port slice and the second switch fixed terminal. And the first on-off switch 51 is connected in series with the first resistor 53 to form the first feedback circuit, the second on-off switch 52 is connected in series with the second resistor 54 to form the second feedback circuit, the third resistor is in series in the third feedback circuit. The first feedback circuit, the second feedback circuit and the third feedback circuit are connected in parallel to the body control module 60.

A raised touch spot 41 is provided on the actuating lever 40, the touch spot 41 is a touch block or a spring leaf. Under the drive of the linear motion of the actuating lever, the touch spot 41 touches the first elastic port slice or the second elastic port slice of the conductive spring leaf, as so to turn on the first feedback circuit or the second feedback circuit. The third feedback circuit is turned on when the actuating lever is out of touch.

In the third embodiment, wherein the specific control process is as follows: the actuating level 40 stretches out to a setting position and touches the first elastic port slice of the signal feedback module 50 as so to turn on the first feedback circuit, by this time, the body control module may detects a first resistance value and makes a judgement that the locking apparatus is at locking status; when the actuating level 40 retracts back to a setting position and touches the second elastic port slice of the signal feedback module 50 as so to turn on the second feedback circuit, by this time, the body control module may detects a second resistance value and makes a judgement that the locking apparatus is at unlocking status; when the actuating lever 40 is going from stretching to retracting or from retracting to stretching, the body control module may detects a third resistance value and makes a judgement that the locking apparatus is at working status or an abnormal status caused by abnormal stuck and power-cut. The body control module is unable to detect any type of resistance value when the locking apparatus is power-cut caused by abnormal status, by this time, it can be concluded that the apparatus is at abnormal status, thus a misjudgement can be avoided.

In the invention, by the signal feedback circuit made up of the connection of the micro switch/travel switch/conductive spring leaf with the resistor, at its different status, the body control module (BCM) 60 may perform a logical judgement according to the various resistance value measured, so that the misjudgement caused by confusion of single signals are avoided.

Figure 12:
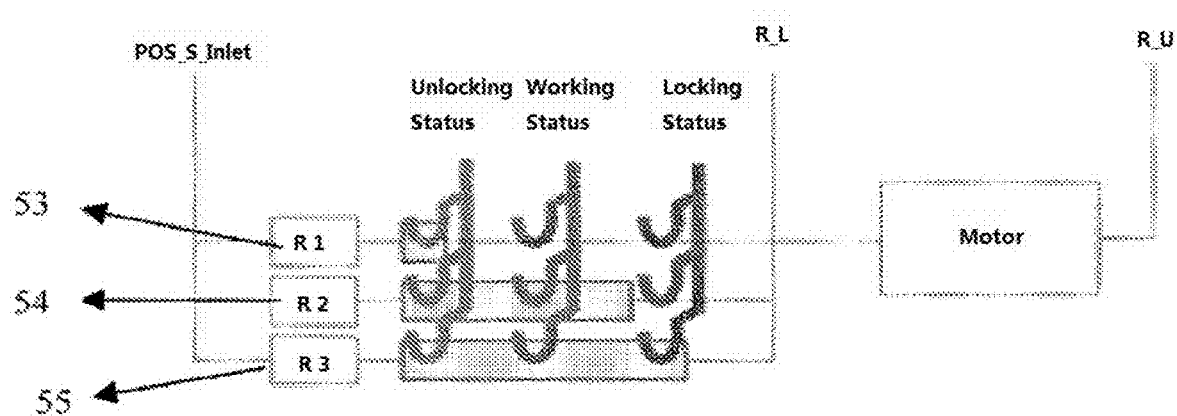
FIG. 12 is a wiring diagram of a fourth preferable embodiment with 3PIN connector.

As shown in FIG. 12, it indicates the specific structure of a fourth preferable embodiment according to the invention. The signal feedback module 50 is integrated and connected to the connector having 3PIN terminal, the first PIN terminal of the connector is defined as Pos_S_Inlet pin, the second PIN terminal is defined as R-L pin, the third PIN is defined as R-U pin, wherein the first feedback circuit, the second feedback circuit and the third feedback circuit are connected in parallel between the Pos_S_Inlet pin and the R-U pin, an end of the motor 20 also uses the R-L pin, and another end of the motor 20 is connected to the R-U pin.

On the basic of this, the first signal feedback is generated according to the first resistance value detected when the first feedback circuit is turned on; the second signal feedback is generated according to the second resistance value detected when the second feedback circuit is turned on; the third signal feedback is generated according to the third resistance value detected when the third feedback circuit is turned on. In the embodiment, the first resistance value is a resistance value generated by the parallel connection of the first resistor 53 and the third resistor 55; the second resistance value is a resistance value generated by the parallel connection of the second resistor 54 and the third resistor 55; the third resistance value is a resistance value of the third resistor 55.

Figure 13:
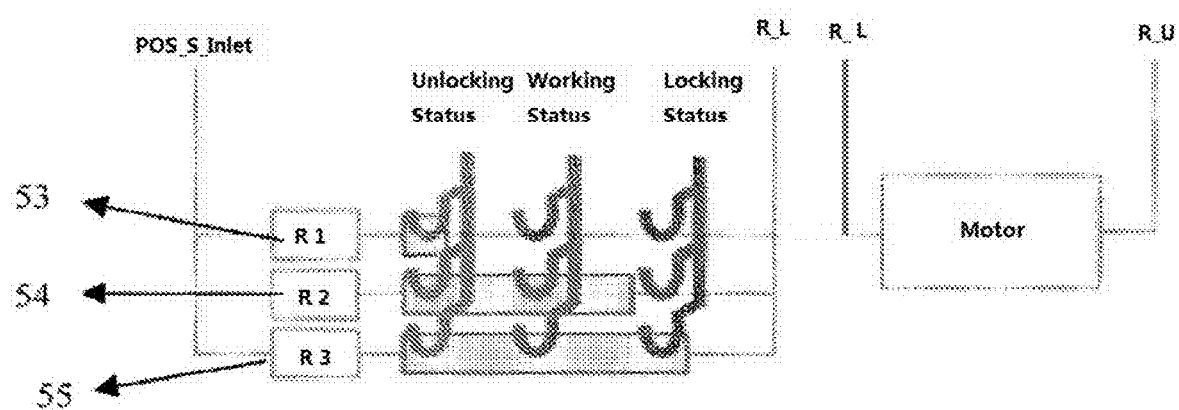
FIG. 13 is a wiring diagram of a fifth preferable embodiment with 4PIN connector.

As shown in FIG. 13, it indicates the specific structures of a fifth preferable embodiment according to the invention. The signal feedback module 50 is integrated and connected to the connector having 4PIN terminal, the differences of the connector compared with the fourth embodiment are those: the R-L pin is separated into two pins, in this way, the first feedback circuit, the second feedback circuit and the third feedback circuit independently are connected in parallel between the Pos_S_Inlet pin and one pin of the R-L pins, the motor 20 independently is connected between the other pin of the R-L pins and the R-U pin.

On basic of this, the control principle of the embodiment is same with that of the fourth embodiment, or which may be the following means: the first signal feedback is generated according to the first resistance value detected when the first feedback circuit and the second feedback are simultaneously turned on; the second signal feedback is generated according to the second resistance value detected when the second feedback circuit is turned on; the third signal feedback is generated according to the third resistance value detected when the third feedback circuit is turned on. In this way, the first resistance value is a resistance value generated by the parallel connection of the first resistor 53, the second resistor 54 and the third resistor 55; the second resistance value is a resistance value generated by the parallel connection of the second resistor 54 and the third resistor 55; the third resistance value is a resistance value of the third resistor 55.

The above described embodiments are only the preferable embodiments of the invention, but not meant to any limitation of the technical scope of the present invention. Any minor amendment, equivalent change and modification made to the above embodiments according to the technical essence of the invention should be part of the scope of the technical solution of the invention.

The invention claimed is:

1. A signal feedback device used for an automotive locking apparatus, the signal feedback device comprising:
   a car power supply,
   a motor,
   a transmission,
   an actuating lever including a touch spot,
   a body control module,
   a signal feedback module having a first feedback circuit, a second feedback circuit and a third feedback circuit, which are connected in parallel to the body control module,
   a first resistor and a first on-off switch are in series in the first feedback circuit, a second resistor and a second on-off switch are in series in the second feedback circuit, a third resistor is in series in the third feedback circuit,
   wherein when linear motion of the actuating lever causes the touch spot to touch the first on-off switch, the first feedback circuit turns on to provide a first signal feedback,
   wherein when linear motion of the actuating lever causes the touch spot to touch the second on-off switch, the second feedback circuit turns on to provide a second signal feedback, and
   the third feedback circuit is turned on when neither the first or second on-off switches are touched, to provide a third signal feedback.

2. The signal feedback device according to claim 1, wherein:
   the first signal feedback is generated according to a first resistance value detected when the first feedback circuit is turned on,
   the second signal feedback is generated according to a second resistance value detected when the second feedback circuit is turned on,
   the third signal feedback is generated according to a third resistance value detected when the third feedback circuit is turned on.

3. The signal feedback device according to claim 2, wherein:
   the first resistance value is a resistance value generated by the parallel connection of the first resistor and the third resistor,
   the second resistance value is a resistance value generated by the parallel connection of the second resistor and the third resistor,
   the third resistance value is a resistance value of the third resistor.

4. The signal feedback device according to claim 1, wherein:
   the first signal feedback is generated according to a first resistance value detected when the first feedback circuit and the second feedback are simultaneously turned on,
   the second signal feedback is generated according to a second resistance value detected when the second feedback circuit is turned on,
   the third signal feedback is generated according to a third resistance value detected when the third feedback circuit is turned on.

5. The signal feedback device according to claim 4, wherein:
   the first resistance value is a resistance value generated by the parallel connection of the first resistor, the second resistor and the third resistor,
   the second resistance value is a resistance value generated by the parallel connection of the second resistor and the third resistor,
   the third resistance value is a resistance value of the third resistor.

6. The signal feedback device according to claim 1, wherein the first on-off switch refers to a first microswitch, the second on-off switch refers to a second microswitch.

7. The signal feedback device according to claim 6, wherein:
   the touch spot of the actuating lever is raised from the surface of the actuating lever,
   the touch spot touches the first microswitch or the second microswitch under the drive of the linear motion of the actuating lever, as so to close the first microswitch or the second microswitch.

8. The signal feedback device according to claim 1, wherein the first on-off switch refers to a first travel switch, the second on-off switch refers to a second travel switch.

9. The signal feedback device according to claim 8, wherein:
   the touch spot of the actuating lever is raised from the surface of the actuating lever,
   the touch spot touches the first travel switch or the second travel switch under the drive of the linear motion of the actuating lever, as so to close the first travel switch or the second travel switch.

10. The signal feedback device according to claim 9, wherein the touch spot contains a first touch spot and a second touch spot, the first touch spot touches the first travel switch as so to close the first travel switch, the second touch spot touches the second travel switch as so to close the second travel switch.

11. The signal feedback device according to claim 1, wherein:
   the first on-off switch is consisted of a first switch fixed terminal and a first elastic port slice,
   the second on-off switch is consisted of a second switch fixed terminal and a second elastic port slice,
   the first elastic port slice and the second elastic port slice are integrally molded on the two ends of a conductive spring leaf.

12. The signal feedback device according to claim 11, wherein:
   the touch spot of the actuating lever is raised from the surface of the actuating lever,
   under the drive of the linear motion of the actuating lever, the touch spot enables the first elastic port slice to touch the first switch fixed terminal, and enables the second elastic port slice to touch the second switch fixed terminal, as so to close the first on-off switch or the second on-off switch.

13. The signal feedback device according to claim 1, wherein the touch spot is a touch block or a spring leaf.

14. The signal feedback device according to claim 1, wherein the transmission drives the actuating lever to move linearly via an engagement of a gear and a rack.

* * * * *